(12) United States Patent
Troesch et al.

(10) Patent No.: US 11,846,716 B2
(45) Date of Patent: Dec. 19, 2023

(54) SYSTEM AND METHOD FOR POSITION DETERMINATION IN A BUILDING

(71) Applicant: Inventio AG, Hergiswil (CH)

(72) Inventors: Florian Troesch, Erlenbach (CH); Armin Wittneben, Zürich (CH); Gregor Dumphart, Zürich (CH); Marc Kuhn, Gockhausen (CH)

(73) Assignee: INVENTIO AG, Hergiswil (CH)

( * ) Notice: Subject to any disclaimer, the term of this patent is extended or adjusted under 35 U.S.C. 154(b) by 337 days.

(21) Appl. No.: 17/250,865

(22) PCT Filed: Oct. 3, 2019

(86) PCT No.: PCT/EP2019/076817
§ 371 (c)(1),
(2) Date: Mar. 15, 2021

(87) PCT Pub. No.: WO2020/074360
PCT Pub. Date: Apr. 16, 2020

(65) Prior Publication Data
US 2022/0043103 A1 Feb. 10, 2022

(30) Foreign Application Priority Data
Oct. 12, 2018 (EP) ..................................... 18200011

(51) Int. Cl.
*G01S 5/02* (2010.01)
(52) U.S. Cl.
CPC ...... *G01S 5/02521* (2020.05); *G01S 5/02523* (2020.05); *G01S 5/02525* (2020.05); *G01S 5/02528* (2020.05)
(58) Field of Classification Search
CPC ....... H04W 4/33; H04W 4/021; H04W 4/023; H04W 64/00; H04W 64/003; G01S 5/013;
(Continued)

(56) References Cited

U.S. PATENT DOCUMENTS

| | | |
|---|---|---|
| 9,080,883 B2 | 7/2015 | Frey |
| 10,068,395 B2 | 9/2018 | Mizon |
| | (Continued) | |

FOREIGN PATENT DOCUMENTS

| | | |
|---|---|---|
| DE | 102013201873 A1 | 8/2014 |
| EP | 2893367 B1 | 7/2015 |
| | (Continued) | |

OTHER PUBLICATIONS

Fleury et al. "Channel Parameter Estimation in Mobile Radio Environments Using the SAGE Algorithm." IEEE Journal on Selected Areas in Communications, vol. 17, No. 3, Mar. 1999, pp. 434-450.

(Continued)

*Primary Examiner* — Kevin Kim
(74) *Attorney, Agent, or Firm* — William J. Clemens; Shumaker, Loop & Kendrick, LLP

(57) ABSTRACT

A system for determining a position of a user in a building includes a control device, a plurality of stationary radio signal transmission devices, a radio signal receiving device, and a signal processing device. The signal processing device determines primary channel impulse responses based on the radio signals received by the receiving device. The signal processing device also determines a secondary channel impulse response based on a secondary radio signal received by the receiving device from a mobile device of a user. The channel impulse responses are evaluated to determine degrees of similarity that indicate how similar a first primary channel impulse response and the secondary channel impulse response are to one another. For each degree of similarity, a distance of the mobile device from the transmission device corresponding to the degree of similarity is determined. A position of the mobile device is determined based on the distances.

15 Claims, 4 Drawing Sheets

(58) Field of Classification Search
CPC ... G01S 5/016; G01S 5/08; G01S 5/14; G01S 5/02; G01S 5/0221; G01S 5/02213
See application file for complete search history.

(56) References Cited

U.S. PATENT DOCUMENTS

| | | |
|---|---|---|
| 2010/0309051 A1 | 12/2010 | Moshfeghi |
| 2011/0171993 A1* | 7/2011 | Kim .................. G01S 5/02524 455/67.11 |
| 2016/0018508 A1 | 1/2016 | Chen et al. |
| 2016/0249316 A1 | 8/2016 | Kudekar et al. |
| 2018/0206078 A1* | 7/2018 | Venkatraman ........ H04W 4/025 |

FOREIGN PATENT DOCUMENTS

| | | |
|---|---|---|
| EP | 2934052 A1 | 10/2015 |
| WO | 03069799 A2 | 8/2003 |
| WO | 03069799 A3 | 8/2003 |
| WO | 2010112586 A1 | 10/2010 |
| WO | 2015023464 A1 | 2/2015 |
| WO | 2016048370 A1 | 3/2016 |
| WO | 2018183571 A1 | 10/2018 |

OTHER PUBLICATIONS

Rhee et al. "Clock Synchronization in Wireless Sensor Networks: An Overview." Sensors 2009, 9, pp. 56-85.
Santos et al. "Modeling the Ultra-Wideband Outdoor Channel: Measurements and Parameter Extraction Method." IEEE Transactions on Wireless Communications, vol. 9, No. 1, Jan. 2010, pp. 282-290.

* cited by examiner

SYSTEM AND METHOD FOR POSITION DETERMINATION IN A BUILDING

FIELD

The technology described here relates generally to a building system. Embodiments of the technology relate in particular to a building system by means of which a position of a user in a building can be determined, and to a method for operating such a system.

BACKGROUND

Building systems can be designed in a wide variety of ways for a wide variety of applications. In a building, it may be of interest, for example, to determine a position of a user. This interest may lie with the user, who wishes to orient himself in the building. The interest may also lie with the building management, who wish to know whether and where a user is in the building. The known global positioning system (GPS) can generally be used to determine a position and for navigation. However, GPS reception is reduced or is even impossible in buildings. Building systems with alternative approaches to position determination are therefore known for buildings. For example, DE 10 2013 201873 A1 (see U.S. Pat. No. 9,080,883 B2) discloses an indoor position determination system that uses RFID technology or NFC (near-field communication) technology to provide radio cells in the building.

The interest of the building management in knowing whether and where a user is in the building also exists in connection with an access control system, which is also an example of a building system. For example, the access control system controls access to a restricted zone (e.g. individual rooms or floors, or floor corridors with access to elevators). In such an access control system, users (persons) can identify themselves as having access authorization in different ways, e.g. with a key, a magnetic, chip or RFID card or a mobile electronic device (e.g. cell phone). WO 2010/112586 A1 (see U.S. Pat. No. 10,068,395 B2) describes an access control system in which a cell phone carried by a user sends an identification code to an access node. If the identification code is identified as valid, the access node sends an access code to the cell phone, which displays the access code on a display. If the user holds the cell phone to a camera so that it can detect the displayed access code, the access control system checks whether the detected access code is valid. If the code is valid, access is granted to the user.

In buildings with many floors, there can be a high volume of people traffic at certain times of the day, for example in an entrance hall of an office building when a large number of employees enter the building in the morning or after a lunch break and reach their workplaces from the entrance hall. At these times, high demands are placed not only on the efficiency of an elevator system installed in the building, but also generally on other building systems present in the building in order e.g. to avoid long waiting times, unrest and disruptions in the entrance hall as far as possible, but without compromising safety. There is therefore a need for technology that meets these requirements, while also being user-friendly.

SUMMARY

One aspect of such technology relates to a method for operating a building system, the building system comprising a control device, transmission devices for primary radio signals, in particular a first transmission device for a first radio signal, a second transmission device for a second radio signal, a third transmission device for a third radio signal, a receiving device for radio signals and a signal processing device connected for communication with the receiving device. In the method, primary channel impulse responses are determined by the signal processing device, a first primary channel impulse response being based on the first radio signal received by the receiving device, a second primary channel impulse response being based on the second radio signal received by the receiving device and a third primary channel impulse response being based on the third radio signal received by the receiving device. The signal processing device determines a secondary channel impulse response based on a secondary radio signal received by the receiving device, the secondary radio signal being transmitted by a first mobile electronic device of a first user. The signal processing device also determines degrees of similarity by evaluating the channel impulse responses, a first degree of similarity indicating how similar the first primary channel impulse response and the secondary channel impulse response are to one another, a second degree of similarity indicating how similar the second primary channel impulse response and the secondary channel impulse response are to one another and a third degree of similarity indicating how similar the third primary channel impulse response and the secondary channel impulse response are to one another. For each degree of similarity, the signal processing device determines a distance of the mobile device from the transmission device corresponding to the degree of similarity, which are arranged at fixed locations in the building. A position of the mobile device is determined by the signal processing device based on the distances.

Another aspect of the technology relates to a system for determining a position of a user in a building. The system comprises a control device, transmission devices for primary radio signals, in particular a first transmission device for a first radio signal, a second transmission device for a second radio signal, and a third transmission device for a third radio signal, a receiving device for radio signals and a signal processing device which is connected for communication with the receiving device. The signal processing device determines primary channel impulse responses, a first primary channel impulse response being based on the first radio signal received by the receiving device, a second primary channel impulse response being based on the second radio signal received by the receiving device and a third primary channel impulse response being based on the third radio signal received by the receiving device. The signal processing device also determines a secondary channel impulse response based on a secondary radio signal received by the receiving device and transmitted by a mobile device of a first user. The signal processing device also determines degrees of similarity by evaluating the channel impulse responses, a first degree of similarity indicating how similar the first primary channel impulse response and the secondary channel impulse response are to one another, a second degree of similarity indicating how similar the second primary channel impulse response and the secondary channel impulse response are to one another and a third degree of similarity indicating how similar the third primary channel impulse response and the secondary channel impulse response are to one another. For each degree of similarity, the signal processing device also determines a distance of the mobile device from the transmission device corresponding to the degree of similarity, which are arranged at fixed locations in the building. A position of the mobile device is determined based on the distances.

The technology described here provides a building system which, on the basis of an evaluation of the radio signals, not only identifies that a user is in the building, but also determines their position in the building. This is implemented in a convenient way for the user because the user does not have to use the mobile electronic device, for example. In addition to such an advantage that a user can perceive, the technology described here also offers significant technical advantages.

In one embodiment, the position of the mobile device is determined using a method for trilateration. Therefore, a method of low complexity, which is known per se, can be used for position determination.

According to the technology described here, the degrees of similarity are based on an evaluation of the channel impulse responses. A first sequence of temporally successive first multipath signal components is determined from each of the primary channel impulse responses, and a second sequence of temporally successive second multipath signal components is determined from the secondary channel impulse response. The evaluation of the primary and secondary channel impulse responses comprises a comparison in pairs, according to the order in the first and second sequence, of every second multipath signal component with its first multipath signal component corresponding to the order, in order to determine a temporal deviation for each pair such that there is a maximum temporal deviation and a minimum temporal deviation, with the degree of similarity being based on at least one of these temporal deviations. The technology described here therefore makes targeted use of multipath signal propagation, which is often viewed as disadvantageous.

Since the multipath signal propagation is used in a targeted manner, the technology described here can also be used when there is no line of sight to the receiving device. The technology described here is therefore also suitable for use in buildings where there may be a high density of users. Such a user density can arise, for example, when there is a high volume of traffic in an entrance hall of an office building or hotel.

The technology described here is also advantageous in that it can be used with both synchronous and asynchronous radio signals. In an embodiment for a synchronous situation, the primary radio signals and the secondary radio signal have a common time reference. For each of the degrees of similarity, the distance is determined according to $$d = E_S \cdot c \cdot SD_S,$$

where: c is the speed of light, $E_S = (K+1)/K$ (correction factor) and $SD_S = \max\{|\Delta_1|, \ldots, |\Delta_K|\}$ (degree of similarity in a synchronous situation).

In an embodiment for an asynchronous situation, the primary radio signals and the secondary radio signal do not have a common time reference. For each of the degrees of similarity, the distance is determined according to $$d_1 = E_A \cdot c/2 \cdot SD_A,$$

where: c is the speed of light, $E_A = (K+1)/(K-1)$ (correction factor) and $SD_A = (\max\{\Delta_1, \ldots, \Delta_K\} - \min\{\Delta_1, \Delta_K\})$ (degree of similarity in an asynchronous situation).

As mentioned above, the technology described here can also be used with more than one user, for example when there is a high volume of traffic. In such a situation, the receiving device receives a number of further secondary radio signals which are transmitted by a number of further mobile electronic devices. Based on each further secondary radio signal received, a channel impulse response is determined which is evaluated in conjunction with the primary channel impulse responses in order to determine distances of the corresponding further mobile electronic device from the transmission devices. This allows the positions of the individual users to be identified even in situations with more than one user.

In one embodiment, the positions of the further mobile electronic devices are used to determine distances between the further users. Such inter-user distances can be used to identify exceptional situations in the building. Such an exceptional situation can possibly occur if an authorized or unauthorized user tries to join a user who is going through a gate in order to enter a restricted zone, for example. The technology described here can also be used to identify such a person pushing in in this manner. If such a situation exists, a security measure can be taken, e.g. triggering an alarm and/or alerting security personnel. In another exceptional situation, some or all of the users present may belong together and as such form a group. In this case, too, security personnel may be alerted, for example, in order to guide the users of this group through the access together, thus keeping the group together and keeping delays to a minimum.

Known standards for radio communication can be used in the technology described here. In one embodiment, the radio signals have a bandwidth of at least 500 MHz, and are transmitted and received according to a WLAN/Wi-Fi standard or a standard for ultra-broadband technology. Examples of such standards are given elsewhere in this description.

In one embodiment, a first identifier is used to determine the building action. If the first user has access authorization, the first identifier is assigned to a user profile in which a user-specific building action is stored. The first identifier is determined in connection with the secondary radio signal. The building action can consist, for example, in initiating an elevator call (destination call) for the user or opening doors or other barriers to which this user has access authorization.

A further advantage of the technology described here is that the evaluation of the received primary and secondary radio signals takes place in the signal processing device, which, for example as a central device, carries out the radio signal evaluation for the entire building, while the transmission devices have a limited range of functions with low complexity; in one embodiment, the range of functions is limited to periodic transmission of a broadband training sequence, possibly in conjunction with an identifier. The transmission devices are therefore relatively inexpensive. Should additional transmission devices be arranged in a zone in order e.g. to improve the accuracy of the distance determination, this can also be done relatively inexpensively.

It is also advantageous that the technology described here can be used in conjunction with an access control system. As a result, a hybrid building system, as it were, can be created that can be used in connection with position determination and/or access control. The position of a user determined using the technology described here can be used to determine their distance from the access to a restricted zone. If this distance is less than a specified minimum distance, this can mean that the user is not only in the public zone but actually wants access. If there are several users in the public zone and their positions are determined, the user actually wanting access can be identified, for example.

DESCRIPTION OF THE DRAWINGS

Various aspects of the improved technology are described in greater detail below with reference to embodiments in conjunction with the drawings. In the drawings, identical elements have identical reference signs. In the drawings.

DETAILED DESCRIPTION

Figure 1:
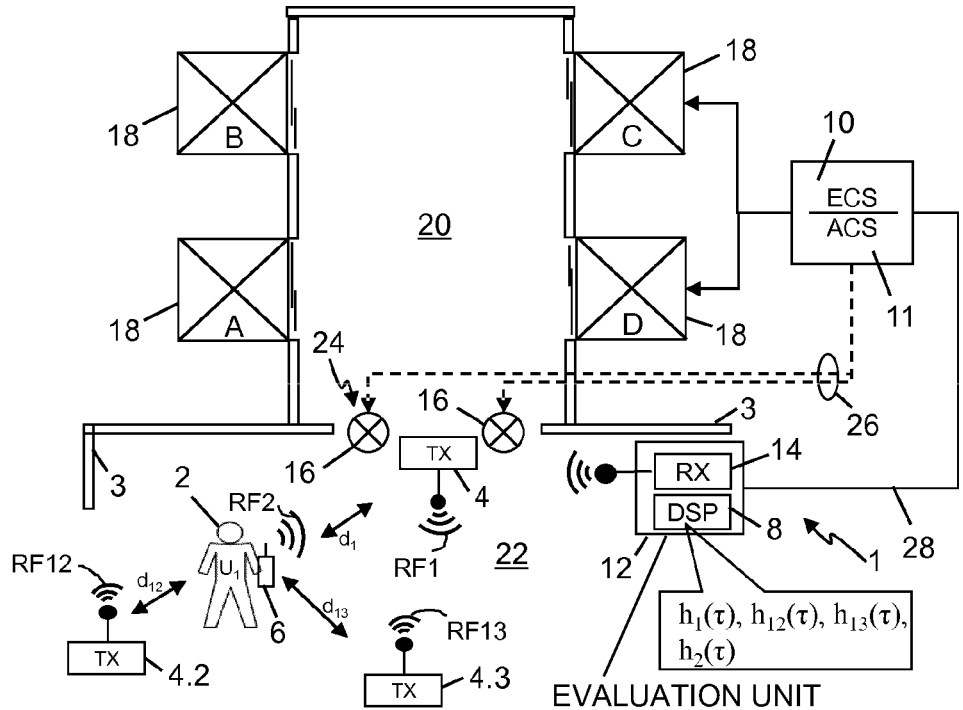
FIG. 1 schematically shows an exemplary situation in a building with a building system according to a first embodiment.
Figure 2:
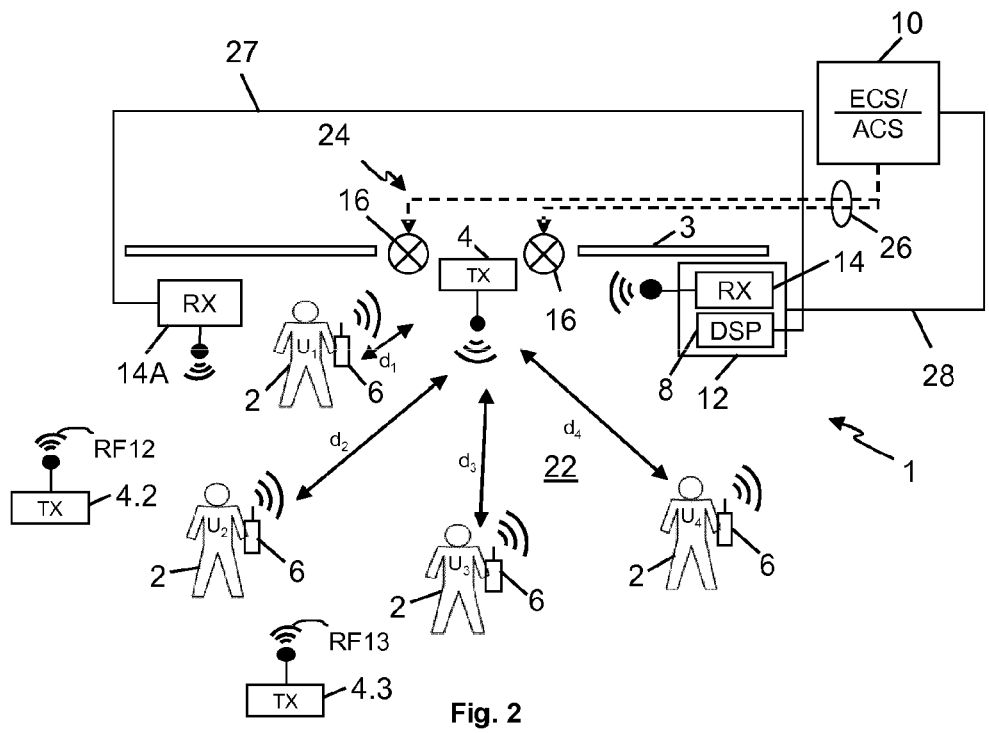
FIG. 2 schematically shows a second embodiment of a building system.

FIG. 1 and FIG. 2 schematically show exemplary situations in a building with a building system 1. The building system 1 can comprise, for example, a system for determining a position of a user 2, an access control system, an elevator system, or a combination of these systems. In the situations shown in FIG. 1 and FIG. 2, an access control system is used, amongst other things, with this application also being able to determine the position of the user 2 in accordance with the technology described here. The building system 1 is also hereinafter referred as an access control system; embodiments of the technology described here are described with reference to an access control system. A person skilled in the art recognizes that the position determination can also be used in situations other than the situations shown in FIG. 1 and FIG. 2, in particular independently of an access control system or an elevator system, for example a determined position can be communicated to the user 2 for orientation and/or guidance.

For illustration reasons, only some walls 3, rooms 18 and zones 20, 22 of the building are marked in FIG. 1 and FIG. 2. The rooms 18 may be e.g. apartments, halls and/or elevator cars of an elevator system. In the situation shown in FIG. 1, a user 2 ($U_1$) carrying a mobile electronic device 6 (also hereinafter referred to as the mobile device 6) is located in the zone 22. The mobile device 6 transmits a radio signal RF2. In the situation shown in FIG. 2, a large number of users 2 ($U_1$, $U_2$, $U_3$, $U_4$) are in the zone 22. The zone 22 is not subject to access restrictions in these exemplary situations and is also hereinafter referred to as the public zone 22. An access 24 separates the public zone 22 from the zone 20, which is subject to access restrictions and adjoins the rooms 18. The zone 20 is also hereinafter referred to as the restricted zone 20. The term "building" in this description is to be understood as meaning residential and/or commercial buildings, sports arenas, airports or ships, for example.

According to one embodiment, the building system 1 comprises a plurality of transmission devices 4, 4.2, 4.3 (each shown as TX) for radio signals RF1, RF12, RF13. In the embodiment shown, the building system 1 comprises three transmission devices 4, 4.2, 4.3, but more than three transmission devices may also be arranged. The transmission devices 4, 4.2, 4.3 are arranged in the building at fixed positions, e.g. they can be specified and documented in a building plan. Such documentation can indicate for each of the transmission devices 4, 4.2, 4.3 on which floor it is arranged and at which position, for example. The position can be given in relation to a selected fixed point, for example.

According to one embodiment, the building system 1 also comprises a receiving device 14 (shown as RX) for radio signals RF1, RF12, RF13, RF2, a signal processing device 8 (shown as a DSP) connected to the receiving device 14 and a controller 11 (shown as ACS). The receiving device 14 and the signal processing device 8 can be arranged in an evaluation unit 12 which is connected to the controller 11 of the building system 1 by a wired and/or wireless connection 28.

In FIG. 2, the application example shown in FIG. 1 is modified in that it comprises a further receiving device 14A. The receiving device 14A is connected to the signal processing device 8 of the evaluation unit 12 by means of a wired and/or wireless connection 27. The receiving device 14A is optional, but may be advantageous for the technology described here, as explained elsewhere in this description. Further components and functions of the building system 1 according to FIG. 1 and FIG. 2 are mentioned elsewhere in this description.

In the situations shown in FIG. 1 and FIG. 2, the technology described here can be used in an advantageous manner in order to operate the building system 1 with the lowest possible complexity. Summarized briefly and by way of example, the building system 1 according to one embodiment is operated as follows: The technology determines a distance $d_1$, $d_{12}$, $d_{13}$ (see FIG. 1) from the user 2 for each of the transmission devices 4, 4.2, 4.3. Since the positions of the transmission devices 4, 4.2, 4.3 in the building are fixed and thus known, the technology determines the position of the user 2 from these distances $d_1$, $d_{12}$, $d_{13}$, for example by a method for trilateration. For this purpose, the technology evaluates radio signals RF1, RF12, RF13, RF2, which are transmitted by the transmission devices 4, 4.2, 4.3 and the mobile device 6 of the user 2 in order to obtain distinguishable channel impulse responses ($h(\tau)$) on the basis thereof. Since the sources of these radio signals (i.e. the transmission devices 4, 4.2, 4.3 and the mobile device 6) are relatively close to one another in the same environment (public zone 22), the radio signals propagate on similar paths (e.g. due to reflections on walls 3 and other effects). For this reason, the closer the mobile device 6 is to a specific transmission device 4, 4.2, 4.3, the more similar the channel impulse responses ($h(\tau)$) assigned to this pair (mobile device 6, specific transmission device 4, 4.2, 4.3) are. The technology described here makes use of this and determines a degree of similarity from the channel impulse responses ($h(\tau)$) of each pair, which indicates how similar the respective channel impulse responses are. Overall, there are at least three degrees of similarity. Each degree of similarity is used to determine the distance $d_1$, $d_{12}$, $d_{13}$ of the mobile device 6 from the relevant transmission device 4, 4.2, 4.3. The at least three distances $d_1$, $d_{12}$, $d_{13}$ in total are then used for position determination.

The radio components of the building system 1 (i.e. the receiving devices 14, 14A and the transmission devices 4, 4.2, 4.3) are arranged in the public zone 22 in the embodiments shown. The transmission device 4 is arranged e.g. at the access 24 or in its vicinity, while the transmission devices 4.2, 4.3 and the receiving devices 14, 14A are arranged at a distance therefrom at other locations in the public zone 22. In the situation shown, the user 2 located there is at a distance $d_1$ from the transmission device 4, a distance $d_{12}$ from the transmission device 4.2 and a distance $d_{13}$ from the transmission device 4.3. A person skilled in the art recognizes that each further user 2 ($U_2$, $U_3$, $U_4$) shown in FIG. 2 is at corresponding distances from the transmission devices 4, 4.2, 4.3; however, for illustration, only distances $d_2$, $d_3$, $d_4$ of the further users 2 ($U_2$, $U_3$, $U_4$) from the transmission device 4 and thus from the access 24 are shown in FIG. 2.

The location of the receiving device 14 is selected such that it receives the radio signals RF1, RF12, RF13 transmitted by the transmission devices 4, 4.2, 4.3 with sufficient signal strength in each case, i.e. a radio signal has a signal strength (for example expressed by an RSSI value (Received Signal Strength Indicator)) at the location of the receiving device 14 that is greater than a predetermined threshold for reliable reception. The location of the receiving device 14A is selected accordingly.

One embodiment of the technology described here is explained in the following with reference to the situation shown in FIG. 1. In one embodiment, the transmission devices 4, 4.2, 4.3 transmit the radio signals RF1, RF12, RF13, which each have a relatively high bandwidth, for example greater than approximately 500 MHz, for example between 1 GHz-4 GHz. The bandwidth, characterized by a lower and an upper limit frequency, specifies the width of the intermediate frequency spectrum in which dominant frequency components of a signal to be transmitted are located. The transmission devices 4, 4.2, 4.3 transmit the radio signals RF1, RF12, RF13 according to a standard for radio communication designed for this bandwidth, for example according to a (broadband) WLAN/Wi-Fi standard (802.11ad) or a standard for ultra-broadband (ultra-wideband (UWB)) technology (IEEE 802.15.4a). The radio signals RF1, RF12, RF13 can also be transmitted according to the 5G standard or a different or future standard for broadband radio communication.

The properties and functions of the transmission devices 4, 4.2, 4.3 are described below by way of example using the transmission device 4. A person skilled in the art recognizes that each further transmission device 4.2, 4.3 has substantially the same properties and functions.

In one embodiment, the transmission device 4 generates and transmits, with the radio signal RF1, a training sequence which is transmitted periodically or continuously. The training sequence consists of predefined bit patterns such that the training sequence is characteristic of the transmission device 4; this allows the radio signal RF1 to be distinguished from other radio signals (e.g. the radio signal RF2). In one embodiment, the radio signal RF1 can be assigned to the transmission device 4 by means of the training sequence in a receiver. The training sequence can be, for example, an m-sequence (maximum length sequence) which can be generated e.g. by means of a shift register with a generator polynomial or by means of a computer program.

In one embodiment, the radio signal RF1 can be configured to transmit additional information in addition to the training sequence, for example information regarding a location of the transmission device 4 or a transmitter identifier that is assigned to the location in a database. The radio signal RF1 can also be provided to cause the mobile device 6 to transmit a response signal, for example in order to put the response signal in a defined temporal relationship with the radio signal RF1; the response signal has a temporal offset with respect to the radio signal RF1, for example.

The receiving device 14 is compatible with the standard for radio communication according to which the transmission devices 4, 4.2, 4.3 transmit. The receiving device 14 is also configured to receive the broadband radio signals RF1, RF12, RF13 and to evaluate the training sequences. The receiving device 14 also receives the radio signal RF2 transmitted by the mobile device 6 of the user 2 when the user 2 or the mobile device 6 is within radio range of the receiving device 14.

The mobile device 6 has a radio module which, in one embodiment, generates and transmits the radio signal RF2 according to the standard for radio communication that is selected for the transmission device 4. Similar to the radio signals RF1, RF12, RF13, the radio signal RF2 is also broadband, i.e. the bandwidth is, for example, greater than approximately 500 MHz, for example between 1 GHz-4 GHz. In one embodiment, the radio module generates and transmits, with the radio signal RF2, a training sequence which is transmitted periodically or continuously and which can be characteristic of the mobile device 6. In the embodiments of the technology described here, the radio module of the mobile device 6 is activated when the user 2 is in the public zone 22. In the activated state, the mobile device 6 transmits the radio signal RF2 continuously, for example; in one embodiment, it can be configured (programmed) in such a way that it transmits the radio signal RF2 only after reception of the radio signal RF1 transmitted by the transmission device 4, for example as a response signal for synchronization purposes.

In one embodiment, the mobile device 6 can also be configured to transmit an identifier that allows the mobile device 6 to be assigned to the user 2 (as explained elsewhere in this description). The identifier can be transmitted with the radio signal RF2, for example embedded therein and according to the radio communication standard used for the radio signal RF2. The identifier can also be transmitted separately from the radio signal RF2, for example using Bluetooth radio technology or a (possibly narrow-band) WLAN/Wi-Fi radio technology; in this case, the selected radio technology is also implemented in the receiving device 14 such that the identifier can be received.

The mobile device 6 can have e.g. an application-specific software application (also referred to as an app) that can be activated by the user 2, for example. The application-specific software application is used in one embodiment in connection with the access control and with the use of elevators. In one embodiment, the application-specific software controls the generation and transmission of the radio signal RF2. Depending on the configuration, this software can also generate the identifier of the mobile device 6, for example an identifier that is unique to the mobile device 6 and cannot be changed over time. Such an identifier generated by software is an alternative to a device identification number and a telephone number, which can also be used as an identifier.

The determination of the degrees of similarity and their application for position determination are explained below in connection with FIG. 3A-FIG. 3F. The explanation is given for the transmission device 4 and the user 2 in order to determine the distance $d_1$ of the user 2 or the mobile device 6 from the transmission device 4. The distances $d_{12}$, $d_{13}$ from the transmission devices 4.2, 4.3 can be determined in an analogous manner.

Figure 3A:
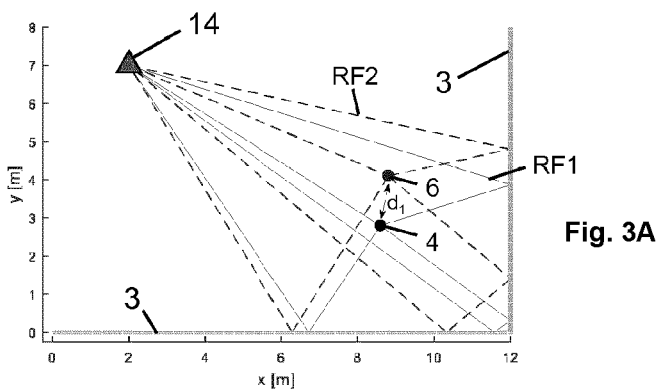
FIG. 3A schematically shows multipath signal propagation between components that can occur in the situation according to FIG. 1.

FIG. 3A schematically shows multipath signal propagation on the basis of radio signal sources (4, 6). In the situation according to FIG. 1, the radio signal sources correspond to the transmission device 4 and the mobile device 6, which are separated from one another by the distance $d_1$. FIG. 3A also shows the receiving device 14 shown in FIG. 1, a wall 3 with two wall surfaces perpendicular to one another and an X-Y coordinate system.

The receiving device 14 receives the radio signals RF1, RF2 transmitted by the mobile device 6 and the transmission device 4. The radio signals RF1, RF2 propagate in space in all directions and are more or less reflected, bent and/or scattered or otherwise influenced in their propagation by any obstacles and walls 3 that may be present. This is known to a person skilled in the art, for example under the term "multipath propagation." For illustration, some of these signal paths are shown in FIG. 3A, with solid lines representing the signal paths of the radio signal RF1 transmitted by the transmission device 4 and broken lines representing the signal paths of the radio signal RF2 transmitted by the mobile device 6. The receiving device 14 receives the radio signal RF2 from the mobile device 6 directly and in a variety of other ways, for example. The receiving device 14 receives the radio signal RF1 from the transmission device 4 in an analogous manner. A person skilled in the art recognizes that direct reception is not always provided because e.g. an obstacle (e.g. a user 2) is located between the receiving device 14 and the transmission device 4, and that in such a case the receiving device 14 only receives signals that propagate indirectly.

As stated above, the radio signals RF1, RF2 received by the receiving device 14 can be distinguished, for example because of different training sequences in one embodiment. If the training sequence is an m-sequence, then, for certain lengths ($2^N-1$) of the bit sequences, orthogonal m-sequences exist by means of which a plurality of transmitters (here the transmission device 4 and the mobile device 6) can transmit a training sequence to a receiver (here the receiving device 14) without causing interference. The radio signal RF2 of the mobile device 6 can also transmit the identifier of the mobile device 6, so that it can be distinguished from the radio signal RF1, even if the radio signal RF1 itself does not contain an individual identifier. The receiving device 14 determines an associated channel impulse response $h_1(\tau)$, $h_2(\tau)$ for each radio signal RF1, RF2.

It is known to a person skilled in the art that the channel impulse response $h(\tau)$ is a description of the current linear transmission channel and, by definition, corresponds to the signal that can be determined at an output of the transmission channel when a Dirac impulse as an input signal is fed to an input of the transmission channel. The channel impulse response describes the effect that the transmission channel has on the input signal, for example as a function of time. Knowing the channel impulse response $h(\tau)$ improves decoding of received symbols in a receiver, for example; therefore, in some radio-based communication systems (e.g. WLAN 802.11) the channel impulse response $h(\tau)$ is estimated on the receiver side. The estimation of the channel impulse response $h(\tau)$ can be based on a received training sequence.

Figure 3C:
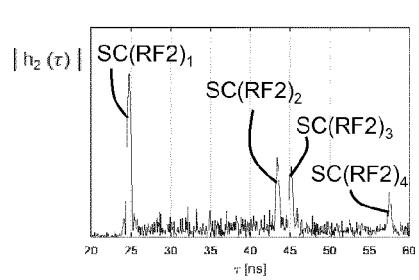
FIG. 3C schematically shows an exemplary second channel impulse response based on a second radio signal.
Figure 3B:
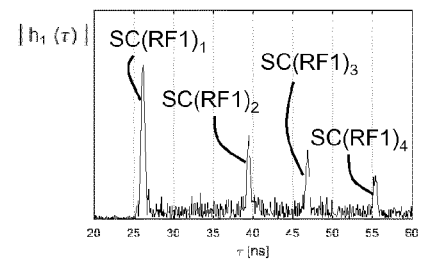
FIG. 3B schematically shows an exemplary first channel impulse response based on a first radio signal.

Based on the radio signal RF1 transmitted by the transmission device 4, a first channel impulse response $h_1(\tau)$ can be determined after reception by the receiving device 14; FIG. 3B schematically shows an exemplary absolute value function $|h_1(\tau)|$ of the first channel impulse response $h_1(\tau)$ as a function of time in nanoseconds (ns). In this exemplary representation, the absolute value function $|h_1(\tau)|$ has four peak values at $\tau_1 \approx 26$ ns, $\tau_2 \approx 40$ ns, $\tau_3 \approx 47$ ns and $\tau_4 \approx 55$ ns; each of these peak values corresponds to a multipath signal component $SC(RF1)_k$ (k=1, 2, 3, 4) of the radio signal RF1, which are taken into account in the evaluation in this embodiment.

Based on the radio signal RF2 transmitted by the mobile device 6, a second channel impulse response $h_2(\tau)$ can be determined after reception by the receiving device 14; FIG. 3C schematically shows an exemplary absolute value function $|h_2(\tau)|$ of the second channel impulse response $h_2(\tau)$ as a function of time in nanoseconds (ns). In this exemplary representation, the absolute value function $|h_2(\tau)|$ has four peak values at $\tau_1 \approx 25$ ns, $\tau_2 \approx 43$ ns, $\tau_3 \approx 45$ ns and $\tau_4 \approx 58$ ns; each of these peak values corresponds to a multipath signal component $SC(RF2)_k$ (k=1, 2, 3, 4) of the radio signal RF2, which are taken into account in the evaluation in this embodiment.

In one embodiment, the multipath signal components $SC(RF1)_1$, $SC(RF2)_1$ can each correspond to a signal component received on a direct radio path. The receiving device 14 thus has a "line of sight" to the transmission device 4 and to the mobile device 6. A person skilled in the art recognizes that, depending on the currently prevailing situation in the public zone 22 (e.g. there is an obstacle (e.g. another user or part of a building) between the mobile device 6 and the receiving device 14), this line of sight may not be provided. In such a situation, at least one of these (first) multipath signal components $SC(RF1)_1$, $SC(RF2)_1$ may not occur. The technology described here also makes it possible to determine the degree of similarity in this situation.

A person skilled in the art also recognizes that the receiving device 14 and the signal processing device 8 are configured e.g. to have a fixed reception bandwidth in order to resolve a plurality of multipath signal components $SC(RF1)_k$, $SC(RF2)_k$ in the radio signals RF1, RF2 so that they can be evaluated. As stated above, the bandwidth of the radio signals RF1, RF2 is greater than 500 MHz, and the reception width of the receiving device 14 must be set accordingly. The higher the bandwidth of the radio signals RF1, RF2, the greater the distance between the signal components $SC(RF1)_k$, $SC(RF2)_k$ and the more accurately the signal components $SC(RF1)_k$, $SC(RF2)_k$ and their temporal difference can be evaluated. A person skilled in the art also recognizes that the number k of the multipath signal components $SC(RF1)_k$, $SC(RF2)_k$ is not limited to four.

Figure 3E:
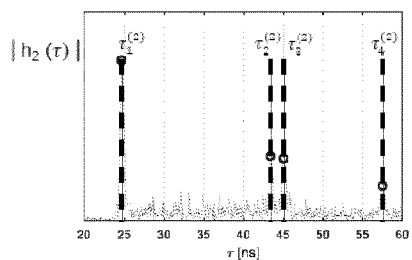
FIG. 3E schematically shows the second channel impulse response with peak values shown by way of example.
Figure 3D:
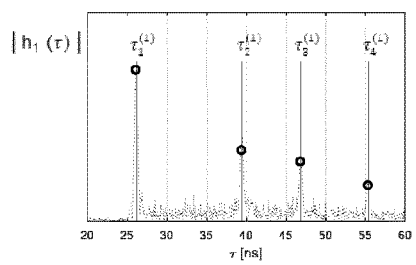
FIG. 3D schematically shows the first channel impulse response with peak values marked by way of example.

The signal processing device 8 detects, for each of the channel impulse responses $h_1(\tau)$, $h_2(\tau)$, the multipath signal components $SC(RF1)_k$, $SC(RF2)_k$, the associated peak values and their temporal occurrence ($\tau$). This is illustrated in FIG. 3D and FIG. 3E. FIG. 3D schematically shows the absolute value function $|h_1(\tau)|$ of the first channel impulse response $h_1(\tau)$ with the indicated exemplary four multipath signal components $SC(RF1)_k$, and FIG. 3E schematically shows the absolute value function $|h_2(\tau)|$ of the second channel impulse response $h_2(\tau)$ with the indicated exemplary four multipath signal components $SC(RF2)_k$, in each case at the times $\tau_1$, $\tau_2$, $\tau_3$, $\tau_4$.

The temporal occurrence of the multipath signal components $SC(RF1)_k$, $SC(RF2)_k$ is extracted from the channel impulse responses $h_1(\tau)$, $h_2(\tau)$. For such an extraction process, the SAGE algorithm (space-alternating generalized expectation-maximization) can be used in one embodiment, as described, for example, in: B. H. Fleury, et al., "Channel parameter estimation in mobile radio environments using the SAGE algorithm," IEEE Journal on selected areas in communications, Vol. 17, No. 3, pages 434-450, 1999, and T. Santos, J. Karedal, P. Almers, F. Tufvesson, and A. Molisch, "Modeling the ultra wideband outdoor channel: Measurements and parameter extraction method," IEEE Transactions on Wireless Communications, Vol. 9, No. 1, pages 282-290, 2010.

From FIG. 3B-3D it can be seen that the channel impulse responses $h_1(\tau)$, $h_2(\tau)$ are similar because the transmission device 4 and the mobile device 6 are relatively close to one another in the same environment (public zone 22). Here, the smaller the distance $d_1$, i.e. the closer the mobile device 6 is to the transmission device 4, the more similar the channel impulse responses $h_1(\tau)$, $h_2(\tau)$ are. In the opposite case, that is to say with increasing distance $d_1$, the similarity of the channel impulse responses $h_1(\tau)$, $h_2(\tau)$ increasingly decreases. In the situation shown in FIG. 1, the environment in which the transmission device 4 and the mobile device 6 are located is relatively limited; e.g. an entrance hall in a building. The similarity of the channel impulse responses $h_1(\tau)$, $h_2(\tau)$ is shown e.g. in that (with line of sight) both have four identifiable protruding multipath signal components $SC(RF1)_k$, $SC(RF2)_k$, which occur at similar times $\tau_1$, $\tau_2$, $\tau_3$, $\tau_4$.

The multipath signal component $SC(RF1)_1$, $SC(RF2)_1$ (k=1) that occurs first in each case results from the radio signal RF1, RF2, which, with line of sight, is received directly (e.g. without reflection on the wall 3) by the receiving device 14. The peak values are usually the greatest for these multipath signal components $SC(RF1)_1$, $SC(RF2)_1$ (k=1) that occur first. The peak values of the following multipath signal components $SC(RF1)_k$, $SC(RF2)_k$ (k=2, 3, 4) generally decrease in order.

According to the technology described here, the similarity of the channel impulse responses $h_1(\tau)$, $h_2(\tau)$ is used to determine a degree of similarity. The distance $d_1$ is determined based on the degree of similarity. To determine the degree of similarity, in one embodiment, the multipath signal components $SC(RF1)_k$, $SC(RF2)_k$ (k=1, 2, 3, 4) are considered in pairs, i.e. the multipath signal components $SC(RF1)_1$, $SC(RF2)_1$ (k=1) that occur first form a pair P1, and the multipath signal components $SC(RF1)_2$, $SC(RF2)_2$ (k=2) that occur second form a pair P2; the pairs P3 and P4 result accordingly.

Figure 3F:
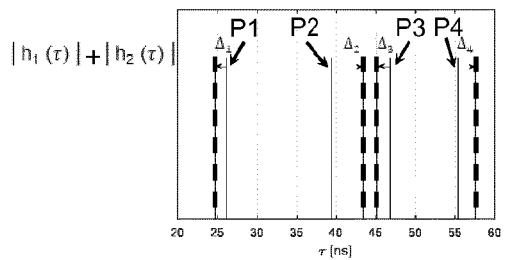
FIG. 3F schematically shows an overlay of the channel impulse responses shown in FIGS. 3D and 3E.

FIG. 3F schematically shows a graphical overlay of the absolute value functions $|h_1(\tau)|$, $|h_2(\tau)|$ shown in FIG. 3D and FIG. 3E, with only the multipath signal components $SC(RF1)_k$, $SC(RF2)_k$ being shown. The aforementioned consideration of the multipath signal components $SC(RF1)_k$, $SC(RF2)_k$ in pairs is also illustrated in FIG. 3F. For each of the pairs P1-P4, a time difference $\Delta_k$ is shown which indicates whether the relevant multipath signal component $SC(RF2)_k$ of the second radio signal RF2 is received by the receiving device 14 before or after the corresponding multipath signal component $SC(RF1)_k$ of the first radio signal RF1. A sign of the time difference $\Delta_k$ indicates which signal component of a pair P1-P4 is received first.

The time differences $\Delta_k$ shown in FIG. 3F result for each pair P1-P4 from the equation $$\Delta_k = \tau^{RF2}_k - \tau^{RF1}_k$$

where $k=1, \ldots, K$. When these time differences $\Delta_k$ are determined, the pair for which the time difference $\Delta_k$ has the greatest value, i.e. $\max\{|\Delta_1|, \ldots, |\Delta_K|\}$, is determined. The maximum of the value over all pairs is a measure of the similarity of the two channel impulse responses $h_1(\tau)$, $h_2(\tau)$; this measure is referred to as the degree of similarity.

For geometric reasons, the distance $d_1$ is limited, i.e.

$$d_1 \geq c \cdot |\Delta_k|$$

for each k. The distance $d_1$ is determined using the equation $$d_1 = E_S \cdot c \cdot SD_S,$$

where: c is the speed of light, $E_S=(K+1)/K$ is a correction factor which is explained below and $SD_S=\max\{|\Delta_1|, \ldots, |\Delta_K|\}$ is a degree of similarity with a common time reference.

In the above explanations for determining the distance $d_1$, it is assumed that the radio signals RF1, RF2 have a common time reference, i.e. are synchronous with one another. This can be achieved, for example, by using high-precision clocks in the transmission device 4, the mobile device 6 and the receiving device 14 and/or by means of so-called round-trip time protocols for synchronizing wirelessly interconnected system components. An overview of such synchronization methods is offered, for example, by Ill-Keun Rhee, et al., "Clock Synchronization in Wireless Sensor Network: An Overview," Sensors 2009, Vol. 9, pages 56-85.

For a very high number K of multipath signal components $SC(RF1)_k$, $SC(RF2)_k$, the correction factor $E_S$ approaches 1 in the case of synchronous radio signals RF1, RF2. Where $E_S=1$, the distance $d_1$ results from $d_1=c \cdot \max\{|\Delta_1|, \ldots, |\Delta_K|\}$. With a relatively small number of K multipath signal components $SC(RF1)_k$, $SC(RF2)_k$, the correction factor is $E_S=(K+1)/K$. In the embodiment described here where K=4, $E_S=5/4$.

The technology described here can also be used when the radio signals RF1, RF2 do not have a common time reference, i.e. are asynchronous with one another. In this case, the distance $d_1$ results according to $$d_1 = E_A \cdot c/2 \cdot SD_A,$$

where: c is the speed of light, $E_A=(K+1)/(K-1)$ is a correction factor which is explained below and $SD_A=(\max\{\Delta_1, \ldots, \Delta_K\} - \min\{\Delta_1, \ldots, \Delta_K\})$ is a degree of similarity with no common time reference.

Even in the case of asynchronous radio signals RF1, RF2, the correction factor $E_A$ approaches 1 for a very high number K of multipath signal components $SC(RF1)_k$, $SC(RF2)_k$. Where $E_A=1$, the distance $d_1$ results from $d_1=c/2 \cdot (\max\{\Delta_1, \ldots, \Delta_K\} - \min\{\Delta_1, \ldots, \Delta_K\})$. With a relatively small number of K multipath signal components $SC(RF1)_k$, $SC(RF2)_k$, the correction factor is $E_A=(K+1)/(K-1)$. In the embodiment described here where K=4, $E_S=5/3$.

The procedure described above determines the distance $d_1$; it specifies how far the user 2 or the mobile device 6 is from the transmission device 4. The distances $d_{12}$, $d_{13}$ can be determined analogously to this procedure. To determine the distances $d_{12}$, $d_{13}$, degrees of similarity are also determined. An evaluation of a channel impulse response $h_{12}(\tau)$ based on the radio signal RF12 (transmission device 4.2) and the channel impulse response $h_2(\tau)$ results in the degree of similarity with respect to the transmission device 4.2 and the mobile device 6. The distance $d_{12}$ between the transmission device 4.2 and the mobile device 6 can be determined therefrom. An evaluation of a channel impulse response $h_{13}(\tau)$ based on the radio signal RF13 (transmission device 4.3) and the channel impulse response $h_2(\tau)$ results in the degree of similarity with respect to the transmission device 4.3 and the mobile device 6. The distance $d_{13}$ between the transmission device 4.3 and the mobile device 6 can be determined therefrom.

The distances $d_1$, $d_{12}$, $d_{13}$ are determined substantially simultaneously by the signal processing device 8. The three distances $d_1$, $d_{12}$, $d_{13}$ with respect to the user 2 are thus available at a particular point in time. Using a method for trilateration, the position of the user 2 in the building can be determined therefrom. Trilateration is a measuring method for position determination of a point, which method is based on distance measurements from three points. If e.g. only the distance from a known point is known, then, when viewed in a plane, an observer is located on a circle around this point. With three known points, the location is on the intersection of the circular lines. The more measurements are available at different reference points, the more precisely the position can be determined. For the technology described here, this means that three or more transmission devices 4, 4.2, 4.3 can be used for position determination.

The knowledge of the position of the user 2 can be used in different ways in the building. In one embodiment, it can be identified whether the user 2 is in the public zone 22 or (with or without authorization) in the restricted zone 20. For an authorized user 2, for example, an identifier transmitted by the mobile device 6 can be used to determine whether the user 2 is known. If the user 2 is known, for example, a user profile is created for him in a building management system, the user profile defining which rights the user 2 has in the building. This can be used, for example, to decide whether and which building action (e.g. a security measure) should be initiated.

In one embodiment, the position is determined continuously. If, for example, a position determination has been completed, a new position determination takes place after a specified period of time. The duration can be e.g. in the range of seconds or milliseconds. Therefore, not only is a current position determined, but a change in position is also identified. If the user 2 walks around in the public zone 22, for example, different positions result in chronological succession. The path taken by the user 2 can thus be followed. Depending on the configuration of the building system 1, the positions and the path can be stored and/or graphically represented in a building plan.

Using the specified period of time, it can also be determined at what speed (V=path/time) the user 2 moves along the path. From the path, it can also be determined in which direction the user 2 is going. For example, if he is moving toward a destination (e.g. elevator or gate), it can be determined when he is likely to arrive there. If this information is available, a building action can be initiated (possibly taking into account the rights defined in the user profile) before the user reaches the destination. The building action can comprise, for example, the provision of an elevator car, the unlocking of a door or the initiation of a security measure (e.g. if an unauthorized user 2 moves toward the gate).

Several users 2 may be present in the public zone 22, as shown in FIG. 2, with each user 2 carrying a mobile device 6. If this is the case, the position of each user 2 present is determined according to the procedure described above. In one embodiment, the mobile devices 6 are differentiated according to the training sequences or identifiers mentioned above. The technology described here can thus be used separately for each present and distinguishable user 2 in order to determine the position or changes in position of this user 2. If the positions of the users 2 present are known, the distances between the users can be determined from this.

The position of the user 2 determined in this way or the positions of the users 2 determined in this way can be used in different ways. Exceptional situations can arise in buildings and situations that are similar to the situations shown in FIG. 1 and FIG. 2, for example. A possibly unauthorized user may follow an authorized user 2 who is allowed to enter the restricted zone 20 so closely that this user may enter the restricted zone 20 undetected as a "free rider." At the turnstile (16) shown in FIG. 1, which is used to isolate users, the unauthorized user can possibly push their way in behind the authorized user. Another exceptional situation can arise if users belonging to a group want access to the zone 20. The users of this group can, for example, be guided jointly through the access 24 in order to keep delays to a minimum. The technology described here can also be used in an advantageous manner for these exceptional situations.

The technology described here identifies, for example, a free rider or pushing-in situation in which an unauthorized user follows an authorized user 2, for example. By means of the procedure described in connection with FIG. 3F, the technology determines the positions of these users and the temporal sequence of these positions. This can be used to determine the distance of the unauthorized user from the authorized user 2. If the distance is less than a specified distance (individual users who do not know one another typically keep their distance from one another, for example), this indicates a pushing-in situation. In this case, the building system 1 can initiate a security measure, for example. The security measure can comprise triggering an alarm and/or alerting security personnel in order to assess whether it is actually a pushing-in situation.

The technology described here also identifies when several users are standing relatively close together and form a group. The identification is based on the fact that a defined limit value for distances for groups has been reached or is not met, e.g. because the users know each other and are therefore closer to one another. This group can be away from other users who may be present, for example. Similarly to the described free rider or pushing-in situation, the identification of a group situation is based on the determination of inter-user distances, i.e. distances that exist between the users. Since the position of each user present is determined, a large number of inter-user distance values can be determined from this. From the evaluation of these distance values it can be identified whether and which users are close to one another. These users are assigned to the group. The building system 1 can also initiate a security measure in this situation, for example requesting security personnel to guide the users in the group through together.

As mentioned above, the building system 1 can comprise an elevator system, an access control system or a combination of such systems. Depending on the position of a user 2 and based on information regarding the access authorization of the user 2, e.g. based on the identifier assigned to him, the access control system controls the access 24 such that only authorized users 2 can enter the zone 20, for example by locking or releasing a door, a barrier, a turnstile, or another physical barrier or gate. In the case of accesses 24 without such physical barriers, the access control system can control the access 24 by triggering an optical and/or acoustic alarm when an unauthorized user is identified, for example; alternatively or in addition, security may be notified. Regardless of whether or not the gate is equipped with a physical barrier, an information device that may be present can also be activated in order e.g. to inform a user. In FIG. 1 and FIG. 2, two turnstiles 16 are shown as exemplary physical barriers, which the controller (ACS) 11 of the access control system controls in each case by means of a wired and/or wireless connection 26.

In FIG. 1 and FIG. 2, components of the access control system are arranged in the access 24 or in the vicinity thereof for the purpose of illustration. Depending on the volume of traffic for which the access control system is intended, the access 24 consists of a plurality of individual gates; for example, each of the two turnstiles 16 can represent a gate. A person skilled in the art recognizes that, in a specific implementation, the access control system or its components can be arranged differently than shown in the drawings. Each individual gate can represent an individual access at which a transmission device 4 can be arranged, for example.

The rooms 18 shown in FIG. 1 can, for example, belong to a group of elevators, which e.g. comprises four elevators (A-D) and is controlled by an elevator controller (ECS) 10. If a user 2 moves toward the access 24, this means, in one embodiment, that the user 2 would like to be transported with one of the elevators to a destination floor specified for this user 2. According to one embodiment, such transport represents a building action desired by the user 2. When the user 2 is identified, a destination call is initiated, to which the elevator control 10 assigns an elevator (A-D) for a journey from a boarding floor to a destination floor. The assigned elevator (A-D) is communicated to the user 2, for example by means of a display unit. In the situations shown in FIG. 1 and FIG. 2, each turnstile 16 can be assigned a display unit. If, for example, the user 2 uses one of the turnstiles 16 shown, the access control system identifies the turnstile 16 at which the user 2 is located and controls the display unit arranged there in order to display the assigned elevator (e.g. "A"). A person skilled in the art recognizes that the assigned elevator can be visually and/or audibly communicated to the user 2.

Figure 4:
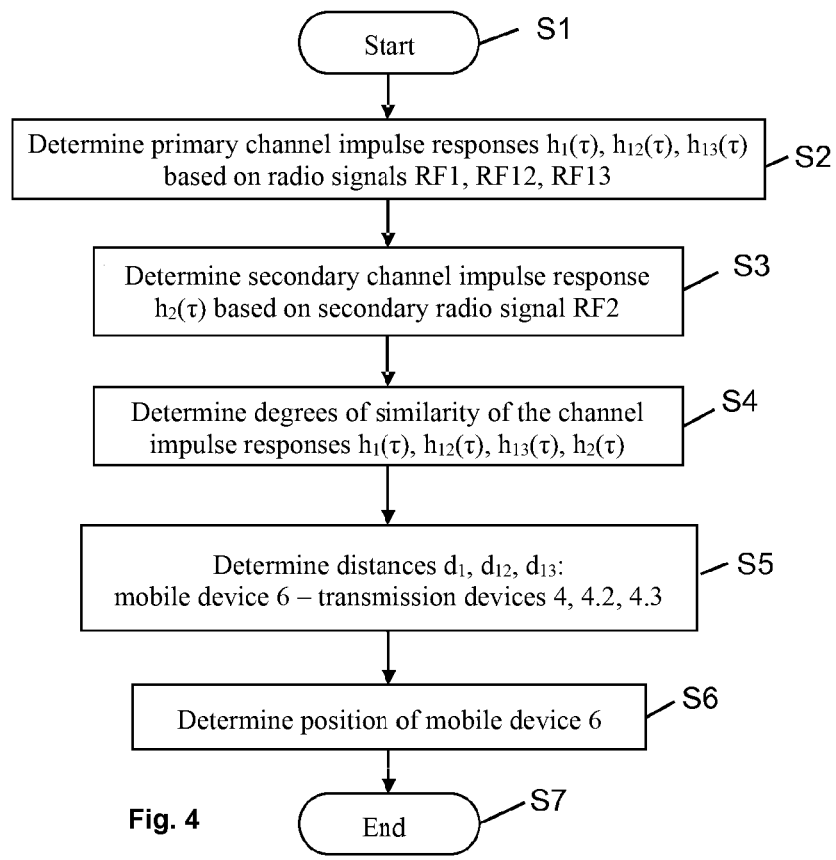
FIG. 4 is a flowchart of an embodiment of a method for determining a position of a user in a building.
Figure 5:
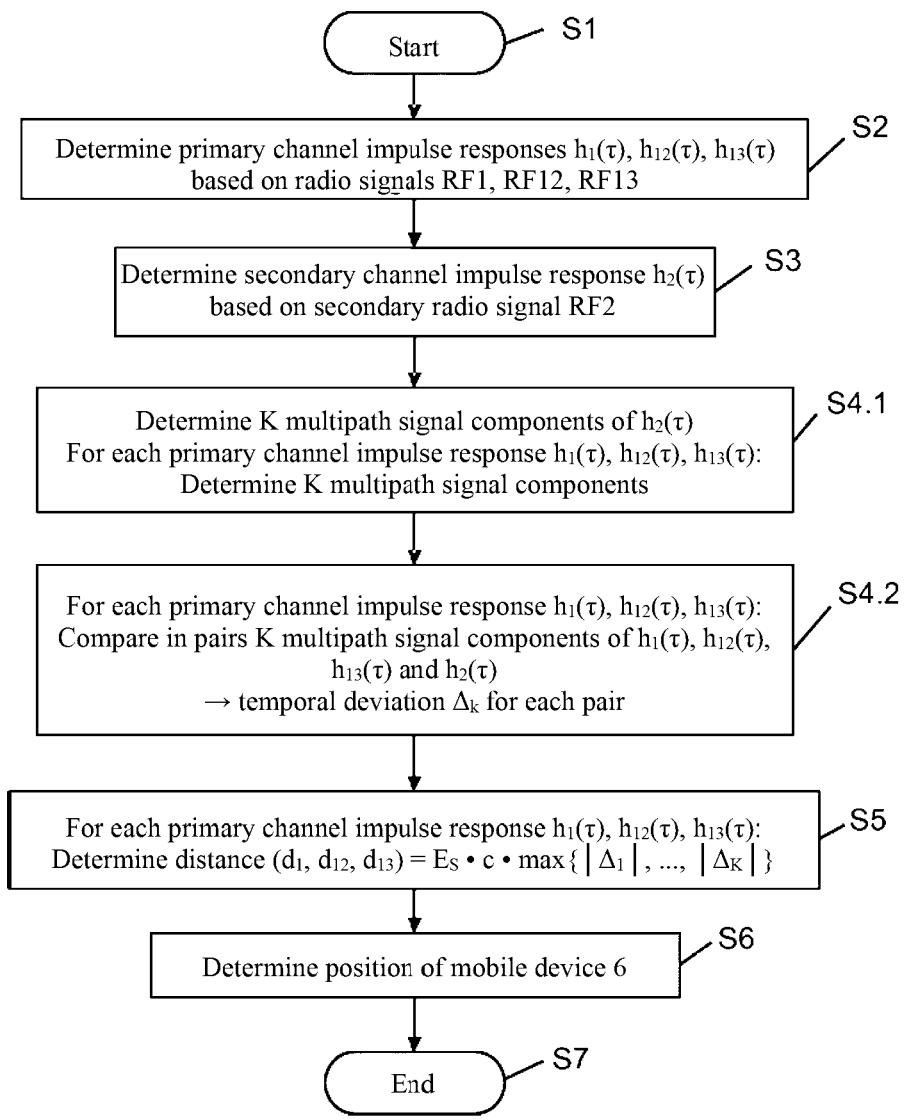
FIG. 5 is a flowchart of a further embodiment of a method for position determination.

With an understanding of the above-described basic system components and their functions, a description of an exemplary method for operating the building system based on the situation shown in FIG. 1 (i.e. a single user 2) is given below in connection with FIG. 4 and FIG. 5. FIG. 4 is a simplified flow chart for the method, while FIG. 5 is a flow chart with more detailed steps of the method.

The description is made with reference to the user 2, who is in the public zone 22 and may wish to enter the restricted zone 20 at the access 24, for example to use an elevator there. The user 2 carries the mobile device 6 with him and has activated its radio module (e.g. for broadband WLAN/Wi-Fi or UWB communication). Any associated software application is activated. The stationary transmission devices 4, 4.2, 4.3 are also activated and transmit the (primary) radio signals RF1, RF12, RF13.

The method shown in FIG. 4 begins with a step S1 and ends with a step S7. A person skilled in the art recognizes that the division into these steps is exemplary, that one or more of these steps can be divided into one or more sub-steps and that a plurality of the steps can be combined into one step.

In a step S2, the receiving device 14 receives the radio signals RF1, RF12, RF13 transmitted by the transmission devices 4, 4.2, 4.3, each radio signal RF1, RF12, RF13 transmitting a training sequence assigned to the relevant transmission device 4, 4.2, 4.3. The signal processing device 8 determines, for each of these received radio signals RF1, RF12, RF13 and on the basis thereof, a channel impulse response $h_1(\tau)$, $h_{12}(\tau)$, $h_{13}(\tau)$, as explained in connection with FIG. 3B. For better differentiation, these channel impulse responses $h_1(\tau)$, $h_{12}(\tau)$, $h_{13}(\tau)$ are also referred to as primary channel impulse responses $h_1(\tau)$, $h_{12}(\tau)$, $h_{13}(\tau)$.

If the user 2 with his mobile device 6 is in the public zone 22 and within radio range of the receiving device 14, the receiving device 14 receives, in a step S3, a (secondary) radio signal RF2 transmitted by the mobile device 6, which signal transmits the training sequence assigned to the mobile device 6. The signal processing device 8 determines a secondary channel impulse response $h_2(\tau)$ based on the received radio signal RF2, as explained in connection with FIG. 3C.

The mobile device 6 transmits the radio signal RF2 for example in response to received radio signals which are transmitted for example periodically by the transmission devices 4, 4.2, 4.3. These radio signals may be radio signals RF1, RF12, RF13 or one or more separate radio signals for synchronization purposes. The radio signal RF2 contains a training sequence, as described above, by means of which the radio signal RF2 in the evaluation device 12 can be distinguished from the radio signals RF1, RF12, RF13. The mobile device 6 can also transmit the radio signal RF2 independently of an external event or influence (e.g. without receiving one or more radio signals), for example controlled by the software application.

The mobile device 6 can also transmit an identifier of the mobile device 6, either embedded in the radio signal RF2 or as a separate radio signal, which e.g. is transmitted according to Bluetooth technology. This identifier can be used to check whether it is assigned to a user 2 with access authorization in a database with a large number of user profiles. The controller 11 of the access control system can carry out this check, for example, immediately after the (first) receipt of the identifier by the receiving device 14, even if the user 2 is only in the public zone 22 and does not yet want access at this point in time. It is also possible for the check to take place only when the user 2 actually wants access, e.g. when he is very close to the access 24 or the transmission device 14. In the embodiment described here, it is assumed that user 2 has access authorization and that a desired building action is initiated for him in a step S6.

In a step S4, the signal processing device 8 determines degrees of similarity of the channel impulse responses $h_1(\tau)$, $h_{12}(\tau)$, $h_{13}(\tau)$, $h_2(\tau)$ by comparing the secondary channel impulse response $h_2(\tau)$ with each of the primary channel impulse responses $h_1(\tau)$, $h_{12}(\tau)$, $h_{13}(\tau)$. The degree of similarity ($\max\{|\Delta_1|, \ldots, |\Delta_K|\}$) is determined according to the above equation $\Delta_k = \tau^{RF2}_k - \tau^{RF1}_k$.

In a step S5, the distances $d_1$, $d_{12}$, $d_{13}$ are determined based on the degrees of similarity. For this purpose, in the case of synchronous radio signals RF1, RF12, RF13, RF2, the distance from each transmission device 4, 4.2, 4.3 is determined according to $d = E_S \cdot c \cdot \max\{|\Delta_1|, \ldots, |\Delta_K|\}$; for asynchronous radio signals RF1, RF12, RF13, RF2, the distance is determined according to $d = E_A \cdot c/2 \cdot (\max\{\Delta_1, \ldots, \Delta_K\} - \min\{\Delta_1, \ldots, \Delta_K\})$.

In a step S6, the position of the mobile device 6 is determined. In one embodiment, the position of the user 2 or of the mobile device 6 is determined from the distances $d_1$, $d_{12}$, $d_{13}$ by means of trilateration. As mentioned above, the position can be determined continuously in order e.g. to follow the path of the user 2.

As mentioned above, FIG. 5 is a flow chart with more detailed steps of the method according to one embodiment. In FIG. 5, the step S4 shown in FIG. 4 is shown in more detail by steps S4.1, S4.2; the steps S1-S3 and S5-S7 substantially correspond to the steps shown in FIG. 4.

In step S4.1 the multipath signal components SC(RF2)$_k$ are determined for the (secondary) channel impulse response $h_2(\tau)$, and multipath signal components are also determined for each primary channel impulse response $h_1(\tau)$, $h_{12}(\tau)$, $h_{13}(\tau)$, as explained in connection with FIG. 3D and FIG. 3E (with respect to the transmission device 4). In the embodiment described here, four multipath signal components (K=4) are determined in each case.

In a step S4.2, for each primary channel impulse response $h_1(\tau)$, $h_{12}(\tau)$, $h_{13}(\tau)$, a comparison is carried out, in pairs, of its multipath signal components with the multipath signal components SC(RF2)$_k$ of the secondary channel impulse responses $h_2(\tau)$. From this comparison, the temporal deviation $\Delta_k = \tau^{RF2}_k - \tau^{RF1}_k$ for each pair P1-P4 is determined as explained in connection with FIG. 3F.

In contrast with the situation shown in FIG. 1, according to the situation shown in FIG. 2 several users 2 ($U_1$, $U_2$, $U_3$, $U_4$) can be in the public zone 22. Each of these users 2 carries a mobile device 6 with them which, as described above, transmits a radio signal according to the radio technology used in the building. The receiving device 14 therefore receives a large number of further radio signals. For each of the radio signals, a further channel impulse response is determined which is compared with the first channel impulse response $h_1(\tau)$ in order to determine a distance $d_1$, $d_2$, $d_3$, $d_4$ of the relevant electrical device 6 from the transmission device 4. Distances from the further transmission devices 4, 4.2, 4.3 can be determined analogously to the above explanations. It can thus be identified, for example, which user 2 ($U_1$, $U_2$, $U_3$, $U_4$) is closest to the transmission device 4.

As mentioned above, in one embodiment, the receiving device 14A is present in addition to the receiving device 14 and is connected to the signal processing device 8, as shown in FIG. 2. The receiving device 14A is arranged such that it receives the radio signals RF1, RF12, RF13 from the transmission devices 4, 4.2, 4.3. If the mobile device 6 is within reception range of the receiving device 14A, it also receives the radio signal RF2 transmitted by the mobile device 6.

The signal processing device 8 thus processes channel impulse responses which are based on the reception of the radio signals RF1, RF12, RF13, RF2 by the receiving device 14A. The processing includes the determination in pairs of time differences $\Delta_k$ according to $\Delta_k = \tau^{RF2}_k - \tau^{RF1}_k$, described in connection with FIG. 3F. The signal processing device 8 also processes the channel impulse responses which are based on the reception of the radio signals RF1, RF12, RF13, RF2 by the receiving device 14, in order to determine the time differences $\Delta_k$. From the total of these time differences $\Delta_k$, i.e. based on the reception by the receiving devices 14, 14A, the pair for which the time difference $\Delta_k$ has the greatest value, i.e. $\max\{|\Delta_1|, \ldots, |\Delta_K|\}$, is determined. The further processing to determine the distance takes place as described above. One advantage of using the additional receiving device 14A is that it improves the accuracy of the distance determination.

Figure 6:
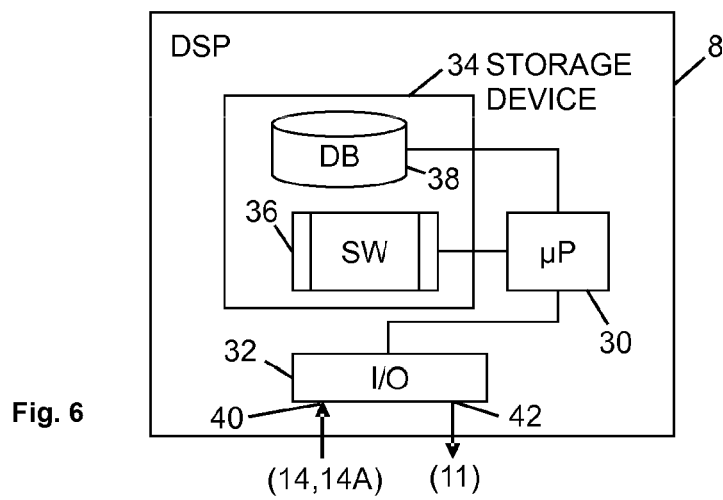
FIG. 6 schematically shows an embodiment of a signal processing device of the building system shown in FIGS. 1 and 2.

FIG. 6 schematically shows an exemplary embodiment of the signal processing device 8 of the access control system 1 shown in FIG. 1 and FIG. 2. The signal processing device 8 comprises a processor unit 30, a storage device 34 and an interface device 32 having a signal input 40 and a signal output 42. The storage device 34 is configured to store a measurement database 38 and a computer program 36. The processor unit 30 is connected for communication with the storage device 34 in order to access the measurement database 38 and the computer program 36 according to the technology described here. The processor unit 30 is also connected for communication with the interface device 32 in order to receive signals from the receiving device 14, 14A via a signal input 40 of the interface device 32 and to transmit signals to the controller 11 of the access control system 1 via a signal output 42 of the interface device 32.

The identifier of the mobile device 6 of a user 2 having access authorization, mentioned in the above embodiments, or the identifiers of other users having access authorization can be stored in a storage device of the access control system 1 in one embodiment. A person skilled in the art recognizes that the number of users 2 present in the public zone 22 varies over time and that the storage device is updated when a mobile device 6 is no longer within radio range, for example because the associated user 2 has left the public zone 22 without desiring access to the restricted zone 20 or because the associated user 2 has already entered the restricted zone 20. The storage device thus stores data records for users 2 who are present in the public zone 22 at a particular point in time. The access control system therefore "knows" how many mobile devices 6 are located within radio range at a particular point in time and, if their users 2 are registered users 2 for the building, to which users 2 the mobile devices 6 belong. At this point in time, the access control system can check for each registered user 2 which rights have been set for the user 2 in the building.

For each registered user 2, a user profile is created in the access control system, i.e. it is stored as a data record in a database. The user profile includes personal data of the user 2 (e.g. name, reason for authorization (resident, employee, external service provider, visitor)), access authorizations (e.g. certain rooms 18 and floors) and any time restrictions (e.g. access from Monday to Friday, from 7:00 a.m. to 8:00 p.m.). In the user profile, the user 2 is also assigned at least one mobile device 6. As an alternative to creating the user profile in the access control system, the user profile may be created in a database of a building management system, it being possible for the access control system to access this database by means of a communication network.

The mobile device 6 may be, for example, a cell phone, a smartphone, a tablet PC or a smartwatch, with these devices usually being equipped with hardware that allows radio communication. However, the mobile device 6 may also be glasses with a miniature computer or another body-worn, computer-aided device (also referred to as a "wearable device"). Depending on the design of the mobile device 6, it may, for example, have a graphical user interface (GUI) in order to be able to selectively activate and deactivate the mobile device 6 and its functions.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for operating a building system of a building, the building system including a controller, first, second and third transmission devices arranged at respective fixed locations in the building and transmitting primary radio signals as a first radio signal, a second radio signal and a third radio signal respectively, a receiving device for receiving the first, second and third radio signals and a signal processing device connected for communication with the receiving device, the method comprising the steps of:

determining by the signal processing device a first primary channel impulse response based on the first radio signal received by the receiving device, a second primary channel impulse response based on the second radio signal received by the receiving device and a third primary channel impulse response based on the third radio signal received by the receiving device;

determining by the signal processing device a secondary channel impulse response based on a secondary radio signal received by the receiving device, wherein the secondary radio signal is transmitted by a mobile electronic device of a user in the building;

determining by the signal processing device first, second and third degrees of similarity by evaluating the primary and secondary channel impulse responses, wherein the first degree of similarity indicates how similar the first primary channel impulse response and the secondary channel impulse response are to one another, wherein the second degree of similarity indicates how similar the second primary channel impulse response and the secondary channel impulse response are to one another and wherein the third degree of similarity indicates how similar the third primary channel impulse response and the secondary channel impulse response are to one another;

determining by the signal processing device for each of the first, second and third degrees of similarity a respective first, second and third distance of the mobile electronic device from the first, second and third transmission devices respectively; and determining by the signal processing device a position of the mobile electronic device in the building based on the first, second and third distances and providing the position to the controller.

2. The method according to claim 1 including determining the position of the mobile electronic device by performing a process of trilateration.

3. The method according to claim 1 including determining an identifier of the mobile electronic device from the second radio signal, wherein the identifier is assigned to a user profile when the user has access authorization in the building.

4. The method according to claim 1 further comprising the steps of:

determining a first sequence of temporally successive first multipath signal components from each of the first, second and third primary channel impulse responses;

determining a second sequence of temporally successive second multipath signal components from the secondary channel impulse response; and wherein the evaluating of the primary and secondary channel impulse responses includes comparing in pairs each of the second multipath signal components with a corresponding one of the first multipath signal components in temporal order of the first and second sequences and determine a temporal deviation for each of the pairs, the temporal deviations including a maximum temporal deviation and a minimum temporal deviation, wherein each of the first, second and third degrees of similarity is based on at least one of the temporal deviations.

5. The method according to claim 4 wherein the first, second and third radio signals and the secondary radio signal have a common time reference and wherein each of the first, second and third distances is determined according to a formula $d=E_S \cdot c \cdot SD_S$, where $E_S=(K+1)/K$ is a correction factor with K being a number of the multipath signal components, c is the speed of light and $SD_S$=the maximum temporal deviation.

6. The method according to claim 4 wherein the first, second and third radio signals and the secondary radio signal do not have a common time reference and wherein each of the first, second and third distances is determined according to a formula $d=E_A \cdot c/2 \cdot SD_A$, where $E_A=(K+1)/(K-1)$ is a correction factor with K being a number of the multipath signal components, c is the speed of light and $SD_A$=the maximum temporal deviation minus the minimum temporal deviation.

7. The method according to claim 1 wherein the mobile electronic device is a first mobile electronic device and the secondary radio signal is a first secondary radio signal, wherein the receiving device receives a second secondary radio signal transmitted by a second mobile electronic device assigned to another user in the building and wherein the signal processing device determines a position of the second mobile electronic device in the building using the second secondary radio signal in place of the first secondary radio signal in the determining steps of the method.

8. The method according to claim 7 including determining a distance between the user and the another user based on the positions of the first and second mobile electronic devices in the building.

9. The method according to claim 1 wherein the first, second and third radio signals and the secondary radio signal each have a bandwidth of at least 500 MHz and are transmitted and received according to a WLAN/Wi-Fi standard or a standard for ultra-broadband technology.

10. A system for determining a position of a user in a building, the system comprising:

a controller;

first, second and third transmission devices arranged at respective fixed locations in the building and transmitting primary radio signals as a first radio signal, a second radio signal and a third radio signal respectively;

a receiving device receiving the first, second and third radio signals; and a signal processing device in communication with the receiving device, the signal processing device being adapted to determine a first primary channel impulse response based on the first radio signal received by the receiving device, a second primary channel impulse response based on the second radio signal received by the receiving device and a third primary channel impulse response based on the third radio signal received by the receiving device, determine a secondary channel impulse response based on a secondary radio signal received by the receiving device, wherein the secondary radio signal is transmitted by a mobile electronic device of a user in the building, determine first, second and third degrees of similarity by evaluating the primary and secondary channel impulse responses, wherein the first degree of similarity indicates how similar the first primary channel impulse response and the secondary channel impulse response are to one another, wherein the second degree of similarity indicates how similar the second primary channel impulse response and the secondary channel impulse response are to one another and wherein the third degree of similarity indicates how similar the third primary channel impulse response and the secondary channel impulse response are to one another, determine for each of the first, second and third degrees of similarity a respective first, second and third distance of the mobile electronic device from the first, second and third transmission devices respectively, and determine a position of the mobile electronic device in the building based on the first, second and third distances and provide the position to the controller.

11. The system according to claim 10 wherein the signal processing device is adapted to determine the position of the mobile electronic device by a process of trilateration.

12. The system according to claim 10 wherein the signal processing device is adapted to:

determine a first sequence of temporally successive first multipath signal components from each of the first, second and third primary channel impulse responses;

determine a second sequence of temporally successive second multipath signal components from the secondary channel impulse response; and wherein the evaluating of the primary and secondary channel impulse responses includes comparing in pairs each of the second multipath signal components with a corresponding one of the first multipath signal components in temporal order of the first and second sequences to determine a temporal deviation for each of the pairs, the temporal deviations including a maximum temporal deviation and a minimum temporal deviation, wherein each of the first, second and third degrees of similarity is based on at least one of the temporal deviations.

13. The system according to claim 12 wherein the first, second and third radio signals and the secondary radio signal have a common time reference and wherein each of the first, second and third distances is determined according to a formula $d=E_S \cdot c \cdot SD_S$ where $E_S=(K+1)/K$ is a correction factor with K being a number of the multipath signal components, c is the speed of light and $SD_S$ is the maximum temporal deviation.

14. The system according to claim 12 wherein the first, second and third radio signals and the secondary radio signal do not have a common time reference and wherein each of the first, second and third distances is determined according to a formula $d=E_A \cdot c/2 \cdot SD_A$, where $E_A=(K+1)/(K-1)$ is a correction factor with K being a number of the multipath signal components, c is the speed of light and $SD_A$ is the maximum temporal deviation minus the minimum temporal deviation.

15. The system according to claim 10 wherein the primary and secondary radio signals each have a bandwidth of at least 500 MHz and the transmission devices and the receiving device are adapted to transmit and receive respectively according to a WLAN/Wi-Fi standard or a standard for ultra-broadband technology.

* * * * *